United States Patent Office 3,493,538
Patented Feb. 3, 1970

3,493,538
DISCOLORATION INHIBITORS FOR POLYETHYLENE
Ival O. Salyer, Dayton, Ohio, and Harry P. Holladay, Creve Coeur, Mo., assignors to Monsanto Company, St. Louis, Mo., a corporation of Delaware
No Drawing. Continuation-in-part of application Ser. No. 288,545, June 17, 1963. This application Nov. 30, 1966, Ser. No. 597,888
Int. Cl. C08f 45/58
U.S. Cl. 260—45.95                                    10 Claims

ABSTRACT OF THE DISCLOSURE

Polyethylene polymers and copolymers prepared by the free radical process which contain a phenolic antioxidant are color stabilized by the addition of an organophosphorus acid containing pentavalent phosphorus.

---

This application is a continuation-in-part of our application, Ser. No. 288,545, filed June 17, 1963, now abandoned.

This invention relates to discoloration inhibitors for solid ethylene polymers and copolymers prepared in the presence of free-radical catalysts and containing phenolic antioxidants.

Saturated hydrocarbon polymers such as polyethylene are more resistant to oxidation than unsaturated polymers but oxidize rapidly at elevated temperatures. The effects of oxidation on polyethylene are deterioration in physical properties, change in electrical properties, cracking and splitting, and development of rancid odor.

Practice is to incorporate substances capable of inhibiting or slowing the rate of oxidation in the polyethylene. These "antioxidants" however suffer the drawback that molded articles, pipe, sheeting, film, fiber, and other material fabricated from oxidation-resistant polyethylene often darken and discolor after several or more days (even when the anti-oxidants are used in very low concentrations).

An object of this invention is to provide discoloration inhibitors for solid ethylene derived polymers that have been stabilized against oxidative degradation.

A more particular object is to provide discoloration inhibitors for solid ethylene derived polymers prepared in the presence of free-radical catalysts and containing phenolic antioxidants.

A specific object is to provide oxidation-resistant polyethylene compositions that are color stable over extended periods of time and use and processes for preparing same.

Other objects and advantages will be apparent in the following description.

The objects of this invention are obtained in the discovery that certain organophosphorus compounds provide stabilized solid ethylene polymers, copolymers and blends thereof with permanent protection against discoloration as presented in detail below.

In accordance with this invention there is provided a discoloration-resistant stabilized ethylene polymer comprising a blend of (1) a normally solid free radical catalyzed ethylene polymer, (2) a stabilizing amount of a phenolic antioxidant and (3) an organophosphorus acid of the formula $RR'_nP(O)(OH)_m$ wherein R is an organic hydrocarbon radical,
R' is selected from the group consisting of organic hydrocarbon radical and hydrogen,
n is an integer from zero to one,
m is an integer from one to two, and
n plus m equals two and the acid is employed in the range of about 0.001 to 10.0 percent by weight of polymer, the improvement being the addition of acid whereby the color characteristics of the stabilized polymer is improved.

In the situation where both R and R' are hydrocarbon radicals they may be the same or different.

Included within the term "organic hydrocarbon radical" are alkyl, aryl cycloalkyl, and arylalkyl groups. These hydrocarbon radicals as a rule have no more than twelve carbon atoms and, preferably, no more than nine carbons. For instance representative radicals are: methyl, ethyl, propyl, t-butyl, butyl, pentyl, hexyl, heptyl, iso-octyl, octyl, nonyl, phenyl, tolyl, xylyl, naphthyl, cyclopropyl, cyclobutyl, cyclopentyl, cyclohexyl, benzyl, etc. Of these the aromatic (aryl) hydrocarbon radicals form particularly effective compounds and are preferred.

The generic formula set forth above is intended to cover three groups of compounds all of which are suitable for the purposes of the present invention. These are: (1) The dihydrocarbon phosphinic acids [RR'P(O)(OH)], (2) The phosphonic acids [RP(O)(OH)$_2$], and (3) The mono-hydrocarbon phosphinic acids [RP(O)(OH)H] which are sometimes referred to as phosphonous acids.

The phosphinic acids and the phosphonic acids are fully oxidized, remarkedly stable derivatives, which are mono- and dibasic, respectively. The latter can be partially esterified (preferably with alcohols having five or fewer carbon atoms) to give monobasic acids which are also suitable for use within this invention.

These organophosphorus acids are available commercially as such or may be prepared from available material by well-known methods. For example hydrolysis of dichlorophosphine (RPCl$_2$) under oxidizing conditions yields the mono-hydrocarbon phosphinic acid [RP(O)(OH)H]; phosphorus pentachloride adds directly to terminal olefinic compounds to give intermediates which are hydrolyzable to the corresponding phosphonic acids; etc. Reference is made to C. M. Kosolapoff in Kirk-Othmer Encyclopedia of Chemical Technology, vol. 10, 499–504. The Interscience Encyclopedia, Inc., New York, 1953 for other examples and procedures.

The organophosphorus acids can be employed in the range of about 0.001 to 10.0 weight percent, based on the polymer but most often 0.01 to 1.0 weight percent is used. As a general rule about the same to about ten times as much organophosphorus acid discolorant is used as phenolic antioxidant. However wide variance is possible and workers skilled in the art can determine the best amount to use for any particular system.

The term ethylene polymers and copolymers refers to the normally solid high molecular weight polymers obtained from ethylene by high pressure polymerization in the presence of catalysts generally referred to as free-radical catalysts. Such polymers have a molecular weight of at least 5,000 and, preferably, 20,000 to 200,000 or more, and have a density not more than 0.940 and preferably 0.925 or lower.

The polymers of this invention differ materially from those ethylene polymers and copolymers obtained from ethylene by low pressure polymerization in the presence of either organometallic catalysts generally referred to as Ziegler catalysts or the supported metal oxide catalysts ranging from the readily apparent density differences to the more subtle qualitative differences. The low pressure polymers are more linear and less branched than the corresponding high pressure polymer. The low pressure polymer contains catalyst residues which are acidic in nature and have strong degrading effect on the polymer. Therefore one adds a neutralizer such as a polyvinyl chloride stabilizer to avoid the degrading effect which is manifested by the darkening or blackening color of the polymer when it is mechanically worked. Conversely a high pressure polymer is normally initiated with a peroxide and the only stabilizer required is an antioxidant to counteract the effect of the residual peroxide and oxygen of the air during processing. A phenolic antioxidant normally is employed and these antioxidants have chromophoric properties which give rise to pinks, greens, and yellows in the stabilized polymer.

Polyethylene suitable for the practice of this invention can, for instance, readily be made by subjecting ethylene containing about 50 to 200 p.p.m. of oxygen to polymerization at very high pressure (e.g., about 15,000 to about 40,000 p.s.i.). Besides molecular oxygen other suitable free-radical catalysts are lauroyl peroxide, t-butyl peroxyisobutyrate, benzoyl, peroxide, p-chlorobenzoyl peroxide, t-butyl peracetate, dicumyl peroxide, di-t-butyl peroxide, cumene hydroperoxide, alpha'-azo-bis isobutyronitrile, trimethylamine oxide hydrate, and other standard catalysts used to prepare high pressure polyethylene.

This invention is particularly applicable to normally solid polyethylene type materials which are copolymers and interpolymers of ethylene and one or more ethylenically unsaturated comonomer polymerizable therewith (under the conditions previously set forth) and employed in an amount not exceeding about 25 percent by weight based on total monomer, copolymers wherein the comonomer does not exceed 15 percent are very useful. For example comonomers which are polymerizable with ethylene are methyl acrylate, methyl methacrylate, vinyl chloride, vinyl acetate, isopropenyl acetate (methyl vinyl acetate), vinylidene chloride, vinylidene chlorofluoride, vinyl fluoride, acrylonitrile, propylene, butene-1 and so forth.

Also included within this invention are polyblends such as polyethylene/polypropylene, polyethylene/butyl rubber, polyethylene/poly methyl acrylate, polyethylene/poly vinyl acetate, polyethylene/poly(ethylene methyl acrylate), polyethylene/poly(ethylene vinyl acetate), polyethylene/poly(ethylene vinyl chloride), etc., where the polyethylene is present in at least 70% by weight based on the total blend.

The antioxidants employed are of the phenolic type commonly used to protect rubber. The simplest ones are phenols alkylated with isobutylene (e.g., 2,6-di-t-butyl-p-cresol) or with styrene. Other suitable stabilizers are the alkylated diphenolics which are condensation products of disubstituted phenols with various aldehydes [e.g., 2,2'-methylene bis(4-methyl-6-t-butyl phenol) and 4,4'-butylidene bis(6-t-butyl-m-cresol)]. The phenolic sulfides are probably the preferred antioxidants. These materials are reaction products of sulfur chloride and alkylated phenols and are usually bis(dialkylphenol)sulfides and can be either monosulfides or disulfides. Such antioxidants are particularly effective where neither alkyl group contains more than twelve carbon atoms and, preferably, five or less such atoms. A particularly preferred class of sulfides but one where discoloration is troublesome has a methyl and a branched-chain alkyl group. One such example is 4,4' - thiobis(3 - methyl - 6 - t - butylphenol. The following compounds are generally suitable: bis(2-methyl-3-isopropylphenol) monosulfide and disulfide, bis(2-methyl-3-t-butylphenol) monosulfide and disulfide, bis(2-methyl-5-t-amylphenol) monosulfide and disulfide, etc. Another class of phenolic antioxidants is represented by the dihydroxy phenols (e.g., hydroquinone monobenzyl ether and 2,5-di-t-amyl hydroquinone).

The antioxidant are generally added to the polyethylene, ethylene containing copolymer, or polymeric blend containing polyethylene in small amounts. Very often less than 0.1 percent by weight based on the total polymer is sufficient and quantities as low as 0.001 weight percent exhibit a protective effect. On the other hand 1.0 weight percent or more can be used under certain circumstances.

The phenolic antioxidants and the organophosphorous acid discoloration inhibitors or mixtures thereof are added to the polymeric material on open rolls, internal mixers, screw-type extruders, and so forth. Preferably both the antioxidant and the discoloration inhibitor are incorporated in the polymeric material in one operation though they can be introduced separately.

The following examples are illustrative of the invention and unless otherwise specified all parts are by weight and all temperatures are expressed as degrees centrigrade.

EXAMPLE 1

Polyethylene having a molecular weight of about 20,000 is prepared by conventional high pressure techniques in the presence of oxygen. This is protected against oxidation by incorporating 0.5 weight percent of 2,6-di-t-butyl-p-cresol (sold under the trademark "Ionol").

Various organophosphorus acids in several concentrations are incorporated in portions of the antioxidant-containing polyethylene by extrusion at about 200 degrees centigrade (process takes about 15 min.). The acids employed are: diphenylphosphinic acid (0.1, 1.0 and 5.0 weight percent), phenylphosphonic acid (0.5 and 1.0 weight percent), and phenylphosphinic acid (1.0 weight percent).

As controls, portions of the antioxidant-containing polyethylene are similarly extruded and comparison is made daily by visual observations.

After one day several controls developed light green discoloration.

After five days all controls show rather dark discloration in comparison with the organophosphorus acid treated samples which have remained white at all concentration levels. Final checks are made after six months and the organophosphorus acid treated samples are still unchanged.

EXAMPLE 2

Polyethylene having a molecular weight of about 35,000 is prepared by conventional high pressure techniques in the presence of di-t-butyl peroxide. This is protected against oxidation by incorporating 0.1 weight perecent of 4,4'-butylidene bis(6-t-butyl-m-cresol) (sold under the trademark "Santowhite powder").

Various organophosphorus acids in several concentrations are incorporated in portions of the antioxidant-containing polyethylene by extrusion at about 250 degrees centigrade (the blending takes about 10 min.). The acids employed are: diphenylphosphinic acid (0.01 and 1.0 weight percent), phenylphosphonic acid (0.1 and 1.0 weight percent), and phenylphosphinic acid (0.5 and 5.0 weight percent).

As controls, portions of the antioxidant-containing polyethylene are similarly extruded and comparison made daily by visual observations.

After the first 24 hour period over half the controls are discolored. After 4 days all controls are discolored to some extent. The organophosphorus acid containing samples remain white even after as long as 6 months.

EXAMPLE 3

Polyethylene having a molecular weight of about 60,000 is prepared by conventional high pressure techniques in the presence of benzoyl peroxide. The polymer is protected against oxidation by incorporating 0.05 weight percent of 4,4'-thiobis(3-methyl-6-t-butylphenol) (sold under the trademark "Santowhite crystals").

Several organophosphorus acids in different concentrations are incorporated in portions of the antioxidant-containing polyethylene by extrusion at about 150 degrees (this requires about 15 min.). The acids are: diphenylphosphinic acid (0.05 and 0.5 weight percent), phenylphosphonic acid (0.01 and 0.1 weight percent), and phenylphosphinic acid (1.0 weight percent).

As controls, portions of the antioxidant-containing polyethylene are similarly extruded and comparison is made with the acid-containing samples daily by visual observations.

After 2 days the controls show some red discoloration which becomes pronounced after 4 days in all the controls. The acid treated samples shown no discoloration up to 6 months.

EXAMPLE 4

An ethylene vinyl acetate copolymer (approximately 15 percent vinyl acetate) is prepared by tumbling seven portions of the same lot of copolymer together. Portions of the resulting blend are stabilized as stated below. The stabilized blend is extruded and then re-extruded through a one and one-half inch extruder at a temperature of 150 degrees centigrade to obtain a pelletized material. After a week the samples were inspected for color.

| Portion | Stabilizer | Amount (percent by weight of copolymer) | Color of pellets |
|---|---|---|---|
| 1 | 4,4'-thiobis(3-methyl-6-t-butylphenol). | 0.1 | Pink orange. |
| 2 | 4,4'-thiobis(3-methyl-6-t-butylphenol). | 0.5 | Do. |
| 3 | 4,4'-thiobis(3-methyl-6-t-butylphenol). | 1.0 | Do. |
| 4 | 4,4'-thiobis(3-methyl-6-t-butylphenol) plus benzene phosphinic acid. | 0.1+0.1 | Very white. |

The foregoing examples have been described in the above specification for the purpose of illustration and not limitation. Many other modifications and ramifications based on this disclosure will naturally suggest themselves to one skilled in the art. These are intended to be comprehended as within the scope of this invention.

What is claimed is:

1. A discoloration-resistant stabilized ethylene polymer comprising a blend of (1) a normally solid free-radical-catalyzed ethylene polymer selected from the group consisting of homopolymers of ethylene and interpolymers of ethylene with one or more ethylenically unsaturated comonomers from the group consisting of methyl acrylate, methyl methacrylate, vinyl chloride, vinyl acetate, isopropenyl acetate, vinylidene chloride, vinylidene chlorofluoride, vinyl fluoride, acrylonitrile, propylene and butene-1 which contain at least 75% by weight of ethylene, (2) a stabilizing amount of a phenolic antioxidant selected from the group consisting of 2,6-di-t-butyl-p-cresol, 4,4'-butylidene bis(6-t-butyl-m-cresol) and 4,4'-thiobis(3-methyl-6-t-butylphenol), and (3) an organophosphorus acid of the formula $RR'_nP(O)(OH)_m$ wherein R is an organic hydrocarbon radical selected from the group consisting of alkyl, aryl, cycloalkyl and arylalkyl, R' is selected from the group consisting of (a) organic hydrocarbon radical selected from the group consisting of alkyl, aryl, cycloalkyl, arylalkyl and (b) hydrogen, $n$ is an integer from zero to one, $m$ is an integer from one to two, and $n$ plus $m$ equals two with the proviso that when $m$ is one and R' is hydrogen, then R is phenyl, the polymer is an ethylene-vinyl acetate copolymer, and the antioxidant is 4,4'-thiobis(3-methyl-6-t-butylphenol) and the acid is employed in the range of about 0.001 to 10.0% by weight of polymer, the improvement being the addition of said organophosphorus acid whereby the color characteristics of the stabilized polymer are improved.

2. The composition according to claim 1 wherein the organophosphorus acid is a phosphinic acid substituted with two organic hydrocarbon radicals.

3. The composition according to claim 2 wherein the phosphinic acid is diphenylphosphinic acid.

4. The composition according to claim 1 wherein the organophosphorus acid is a phosphonic acid.

5. The composition according to claim 4 wherein the phosphonic acid is phenylphosphonic acid.

6. The composition according to claim 1 wherein the organophosphorus acid is phenylphosphinic acid.

7. The composition according to claim 1 wherein the polymer is the homopolymer polyethylene.

8. The composition according to claim 1 wherein the phenolic antioxidant is employed in an amount from about 0.001 to 1.0 percent and the organophosphorus acid is employed in an amount from about 0.01 to 1.0 percent based on the weight of the polymer.

9. The composition according to claim 1 wherein the phenolic antioxidant is 4,4'-thiobis(3-methyl-6-t-butylphenol).

10. The composition according to claim 1 wherein the phenolic antioxidant is 2,6-di-t-butyl-p-cresol.

References Cited

UNITED STATES PATENTS

| 2,230,371 | 2/1941 | Bolton | 260—45.7 XR |
| 2,985,617 | 5/1961 | Salyer et al. | 260—45.7 |
| 2,997,454 | 8/1961 | Leistner et al. | 260—45.8 |
| 3,398,115 | 8/1968 | Hecker et al. | 260—45.85 |
| 3,406,135 | 10/1968 | Hecker et al. | 260—45.7 XR |

FOREIGN PATENTS

| 626,323 | 4/1963 | Belgium. |
| 982,208 | 2/1965 | Great Britain. |

DONALD E. CZAJA, Primary Examiner

M. J. WELSH, Assistant Examiner

U.S. Cl. X.R.

260—45.7